(12) United States Patent
Sandevi et al.

(10) Patent No.: US 6,682,674 B2
(45) Date of Patent: Jan. 27, 2004

(54) METHOD OF MAKING A SHIELD CAN

(75) Inventors: Tommy Sandevi, Malmö (SE); Gustav Fagrenius, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/036,632

(22) Filed: Dec. 21, 2001

(65) Prior Publication Data

US 2002/0079606 A1 Jun. 27, 2002

Related U.S. Application Data
(60) Provisional application No. 60/260,804, filed on Jan. 10, 2001, now abandoned.

(30) Foreign Application Priority Data

Dec. 27, 2000 (SE) .............................. 0004850-4

(51) Int. Cl.$^7$ ................................................ B29C 45/14
(52) U.S. Cl. .................. 264/135; 264/255; 264/259; 264/272.17; 264/328.8
(58) Field of Search ................................. 264/104, 105, 264/250, 254, 255, 259, 267, 268, 271.1, 272.11, 272.15, 272.17, 275, 277, 278; 174/35 R, 35 GC

(56) References Cited

U.S. PATENT DOCUMENTS

| | | | |
|---|---|---|---|
| 3,909,504 A | * | 9/1975 | Browne ..................... 174/52.2 |
| 5,030,406 A | * | 7/1991 | Sorensen .................... 264/255 |
| 5,049,343 A | * | 9/1991 | Sorensen .................... 264/255 |
| 5,663,106 A | * | 9/1997 | Karavakis et al. ............ 29/841 |
| 5,768,813 A | * | 6/1998 | Reboul et al. ................ 40/301 |
| 5,837,086 A |   | 11/1998 | Leeb et al. |
| 5,997,798 A | * | 12/1999 | Tetreault et al. ............ 264/510 |
| 6,036,908 A | * | 3/2000 | Nishida et al. ............. 264/254 |
| 6,261,508 B1 | * | 7/2001 | Featherby et al. .......... 264/408 |
| 6,372,170 B1 | * | 4/2002 | Nishida et al. ............. 264/255 |
| 6,428,730 B1 | * | 8/2002 | Nishida ..................... 264/255 |
| 6,461,558 B1 | * | 10/2002 | Berghoff ................ 264/272.17 |

FOREIGN PATENT DOCUMENTS

| | | |
|---|---|---|
| JP | 5-147396 A | 6/1993 |
| JP | 12-236190 A | 8/2000 |
| WO | 98/54942 A1 | 12/1998 |

* cited by examiner

*Primary Examiner*—Angela Ortiz
(74) *Attorney, Agent, or Firm*—Burns, Doane, Swecker & Mathis, L.L.P.

(57) ABSTRACT

Shield cans and methods for manufacturing such are presented. The shield cans include a plastic housing, a conductive inlay, and a conductive gasket. The shield cans are manufactured using a multi-k procedure in one single mould. The mould includes of a fixed mould part and a rotary mould part having projections and recesses. A conductive inlay is placed on one projection and the plastic housing formed on one side of the inlay. The rotary mould part is rotated, after which the gasket is formed on the side of the inlay opposite the housing.

12 Claims, 1 Drawing Sheet

METHOD OF MAKING A SHIELD CAN

This application claims priority under 35 U.S.C. §119 to U.S. Provisional Application No. 60/260,804, entitled Shield Can, filed on Jan. 10, 2001, now abandoned the entire content of which is hereby incorporated by reference.

This application claims priority under 35 U.S.C. §§119 and/or 365 to 0004850-4 filed in Sweden on Dec. 27, 2000; the entire content of which is hereby incorporated by reference.

BACKGROUND

The present invention concerns shielding of electronic equipment, and more specifically a method of manufacturing shield cans utilized for such shielding. The shield can is used to protect electronic equipment from interfering radiation and is often a combination of a plastic housing, a conductive layer and a conductive gasket. The conductive layer is in electrical contact with a printed circuit board of the electronic equipment.

To protect electronic equipment against interfering radiation some kind of conductive shield is normally placed on or in connection with a printed circuit board of the electronic equipment. Such a shield functions also to reduce the risk that the electronic equipment itself disturbs other surrounding electronic equipment.

A shield of this kind often has the form of a shield can comprising a plastic housing, a conductive layer on the inside of the housing and a conductive gasket. The conductive layer should be in electrical contact with the printed circuit board.

According to the prior art a shield can is normally manufactured in three steps. First the housing of the shield can is moulded by injection moulding. The next step is to make at least one of the surfaces of the shield electrically conductive by some kind of surface treatment. Finally a gasket is added, which in the prior art often has been done by over-moulding on the plastic housing. After assembly the shield can shall be in electrical contact with the printed circuit board.

The above different steps of manufacturing the shield can, are almost never provided by the same manufacturer. This means that the shield can must be transported between the different manufactures to be handled in the different processes, causing high logistic costs. Handling of the shield can in several moulds in different processes and locations causes tolerance problems.

When the gasket is moulded over the plastic housing, the plastic will often be deformed. Furthermore, the shield can is handled in at least two moulds and every time the shield can is ejected from a mould there is a clear risk that the shield can will get small scratch marks. The above leads to a rather high rejection rate for shield cans manufactured according to the prior art, especially if the shield can is a cosmetic part, e.g. the back cover of a mobile telephone.

SUMMARY

To overcome the above problems, according to the invention the shield can is manufactured in one single tool, i.e. one single mould, by means of a multi-k procedure.

Instead of surface treatment as in the prior art a conductive inlay, such as a foil, cloth or the like is used. The conductive inlay is pre-formed and then placed in the mould. By using a so-called 2-k ("zwei Komponenten") mould procedure a plastic housing is first formed on one side of the inlay. In a subsequent step a conductive gasket is formed on the other side of the inlay.

By using the conductive inlay in the mould and a 2-k mould procedure it is possible to mould complete shield cans having a conductive layer and a conductive gasket in one single mould. Instead of transporting a plastic shield can two or more times, lightweight non-space demanding inlay is transported once. Tolerance problems that occurs in the prior art of moulding gaskets over a plastic housing are eliminated due to that only one tool is used. The shield can is only handled in one process reducing the risk of scratches and other damages. The reduced risk of damages will lower the reject ratio, especially if the shield can is a cosmetic part.

It should be emphasised that the term "comprises/comprising" when used in this specification is taken to specify the presence of stated features, integers, steps or components but does not preclude the presence or addition of one or more other features, integers, steps, components or groups thereof.

As used in this description the term "conductive" is to be understood as electrically conductive, if not stated otherwise.

BRIEF DESCRIPTION OF THE DRAWINGS

The invention will be described more closely below, by way of an example and with reference to the enclosed drawings. In the drawings.

DETAILED DESCRIPTION

Figure 1C:
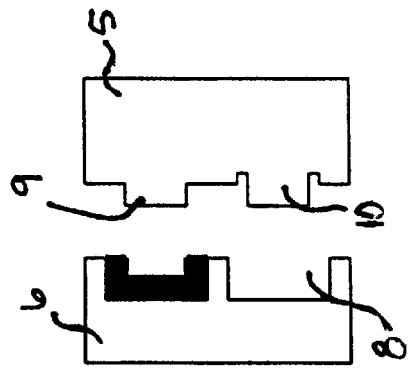
FIGS. 1a to 1f show consecutive steps in the manufacture of a shield can according to the present invention.

The term "electronic equipment" includes portable radio communication equipment. The term portable radio communication equipment includes all equipment such as mobile telephones, pagers, communicators, i.e. electronic organizers, smartphones or the like.

The shield can 1 of the present invention and as shown in the enclosed Figs., comprises a plastic housing 2, a conductive inlay 3, placed in a recess of the plastic housing 2 and a conductive gasket 4 in electrical contact with the conductive inlay 3. In other embodiments (not shown) the conductive inlay is placed on the opposite side of the plastic housing 2.

The conductive inlay 3 is a foil, a cloth or the like. If a foil is used it will normally be made of a plastic comprising an electrically conductive layer. It is also possible to make the foil of a conductive material, having no separate layers. If a cloth is used it will at least partly have threads of a conductive material or threads covered by an electrically conductive material. A primer is often used to adhere the inlay 3 to the plastic housing.

The gasket 4 should be elastic and take up any variations of the dimensional accuracy, within the given tolerances. The gasket 4 is made of an elastomeric material, e.g. silicone or polyurethane, in which conductive particles are imbedded. The conductive particles, e.g. beads or flakes, may be of silver, carbon or may be of copper, glass or other suitable material plated with silver. Instead of silver it is possible to use any conductive material for the plating or any conductive solid material. The elastomeric material used for the manufacture of the gasket 4 is often a thermosetting material. In some embodiments a non-thermosetting elastomeric material is used for the gasket 4.

The mould used according to the present invention to manufacture the shield cans 1 comprises a fixed mould part 5 and a rotary mould part 6. The fixed mould part 5 has two protruding parts or projections 9, 10 which are to co-act with two recesses 7, 8 of the rotary mould part 6. A groove 11, for the forming of the gasket 4, surrounds one of the projections 10 of the fixed mould part 5. The groove 11 may have a relatively complex form, depending on the desired form of the gasket 4. The recesses 7, 8 of the rotary mould part 6 usually have identical design. In some embodiments (not shown) the recesses 7, 8 do not have identical design, whereby it is possible to produce shield cans with varying design in a running mode. When the mould is closed in that the rotary part 6 is brought against the fixed part 5, said projections 9, 10 and recesses 7, 8 will form two cavities. The form of the recesses 7, 8 and the projections 9, 10 will vary depending on the desired form of the finished shield can 1.

A person skilled in the art realizes that the recesses 7, 8 may be placed in the fixed mould part and the projections 9, 10 in the rotary mould part, without departing from the idea and scope of the present invention.

As stated above the shield can 1 is to be placed on a printed circuit board, which may have different areas that should be electrically separated from each other. In such a case the mould parts 5, 6 are formed to give a housing 2 furnished with different compartments, reflecting the separated areas of the printed circuit board. When the housing 2 has several compartments each compartment is furnished with a conductive inlay 3 and a conductive gasket 4. The conductive inlay may also be a single continuous inlay for all the compartments. In other embodiments the plastic housing 5 has only one compartment with an outer contour adapted to the form of the section of the printed circuit board to be shielded. Often only a section of the printed circuit board is to be shielded.

Figure 1F:
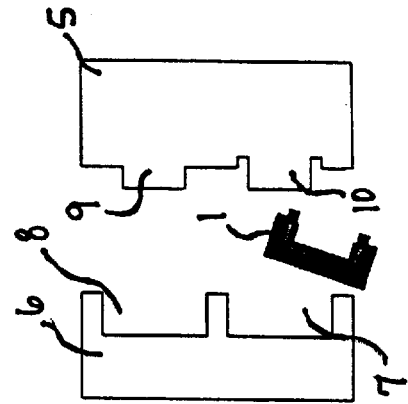
Figure 1B:
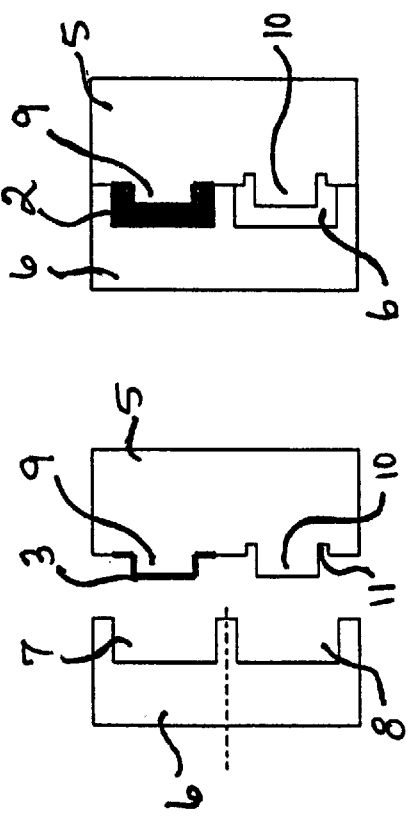
Figure 1E:
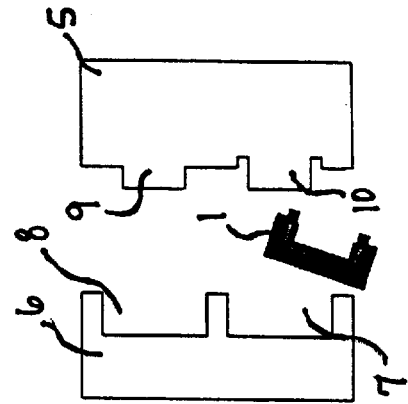
Figure 1A:
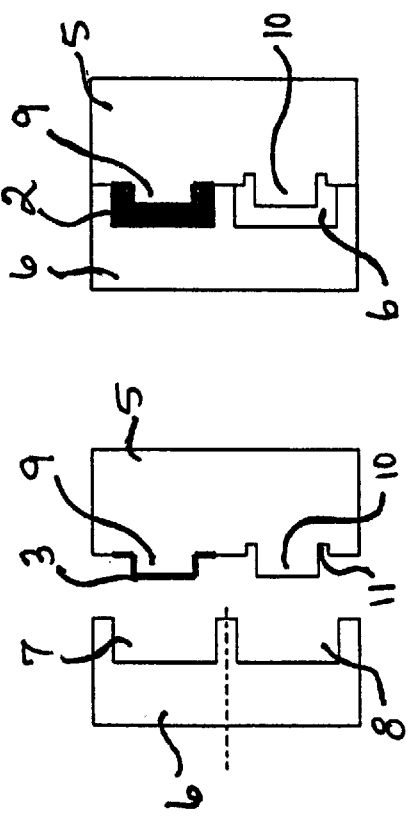

When a shield can 1 is to be manufactured the first step is to place a preformed inlay 3 on the projection 9 not surrounded by a groove, in on of the mould parts. In the shown embodiment the inlay 3 is placed in the fixed mould part 5. (FIG. 1a.)

The next step is to close the mould, whereby the inlay is situated in a cavity formed by one of the recesses 7 of the rotary mould part 6 and said projection 9 of the fixed mould part 5. The plastic housing 2 is then formed on the inlay 3, by injection moulding or the like. (FIG. 1b.)

Figure 1D:
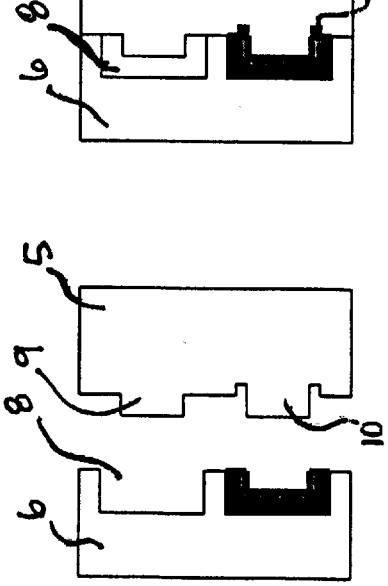

The mould is then opened (FIG. 1c) and thereafter the rotary mould part 6 is rotated 180°. (FIG. 1d.) In other embodiments the rotary mould part is rotated in another extent. The rotary mould part is always rotated 360°/n, where n is an integer equal to or larger than two. As the mould is closed again the newly formed housing 2 and the inlay are placed on a projection 10 of the fixed mould part 5, which projection 10 is surrounded by the groove 11.

Elastomeric material to form the gasket 4 is then injected in the groove 11. (FIG. 1e.) The last step is that the finished shield can 1 is ejected from the opened mould. (FIG. 1f.)

As methods for forming the housing 2 and gasket 4 is well known to persons skilled in the art it will not be described in detail here.

Normally the shield cans 1 are not manufactured one by one. When the rotary mould part 6 has been rotated 360°/n a new inlay 3 is placed on the projection 9 not surrounded by the groove 11. Thus, when the mould is closed there is a preformed inlay 3 in the upper part of the mould (as shown in the Figs.) and a plastic housing 2, with an inlay 3 in the lower part of the mould. After the closing of the mould a plastic housing 2 is formed in the upper part of the mould and a gasket 4 is formed in the lower part of the mould. The above steps are then repeated to give a running production of shield cans 1.

In an alternative method the gasket 4 is first formed on the conductive inlay 3 and then the plastic housing 2 is formed to give the shield can 1.

In use the shield can 1 is connected to the ground of the printed circuit board of the electronic equipment.

The shield can 1 of the present invention is developed for use in mobile telephones. However, a person skilled in the art realizes that it may be used in connection with any electronic equipment in need of any shielding.

What is claimed is:

1. A method of manufacturing shield cans, the method comprising the steps of:
   using a multi-k mould procedure to form a shield can including a plastic housing, a conductive inlay, and a conductive gasket;
   forming the shield can in a single mould that includes a fixed mould part and a rotary mould part, one of the fixed and rotary mould parts having two recesses for forming and holding the plastic housing, the other of the fixed and rotary mould parts having projections to be received in the recesses when the mould is closed;
   placing the conductive inlay on one of the projections;
   forming the plastic housing by injecting a plastic in the recess surrounding the projection on which the conductive inlay is placed when the mould is closed; and
   adhering the inlay to the plastic housing using a primer;
   wherein the conductive inlay is a foil or cloth having an electrically conductive layer that forms at least part of the foil or cloth.

2. The method of claim 1, wherein the multi-k mould procedure is a 2-k mould procedure.

3. The method of claim 1, wherein the gasket is formed in a groove surrounding one of the projections.

4. The method of claim 1, wherein the conductive inlay is placed in one of the recesses, and the plastic housing is formed by injecting of a plastic in the recess in which the inlay was placed.

5. The method of claim 1, wherein conductive particles or particles plated with a conductive material are embedded in the electrically conductive layer, the particles comprise at least one of copper, silver, glass and carbon, and the particles are beads or flakes.

6. The method of claim 1, wherein after forming the plastic housings, the mould is opened and the rotary mould part is rotated 360° divided by n, where n is at least an integer of two, and the mould then is closed to form the conductive gasket in the groove.

7. The method of claim 6, wherein after the rotary mould part is rotated, another inlay is placed on one of the now empty projection and recess before reclosing the mould.

8. The method of claim 1, wherein the shield can is placed on a printed circuit board with an electrical contact between the conductive gasket of the shield can and the printed circuit board and the gasket is in electrical contact with the conductive inlay.

9. The method of claim 8, wherein the plastic housing is formed having several compartments to shield different parts of the printed circuit board from each other and the surroundings.

10. The method of claim 1, wherein the conductive gasket comprises an elastic material.

11. The method of claim 10, wherein the gasket comprises a thermosetting elastomeric material.

12. The method of claim 10, wherein the gasket comprises a non-thermosetting elastomeric material.

* * * * *